United States Patent
Mutoh et al.

(10) Patent No.: US 10,693,135 B2
(45) Date of Patent: Jun. 23, 2020

(54) METHOD FOR PRODUCING COMPOSITE, AND NEGATIVE ELECTRODE MATERIAL FOR LITHIUM ION BATTERY

(71) Applicants: SHOWA DENKO K.K., Tokyo (JP); UMICORE, Brussels (BE)

(72) Inventors: Arihiro Mutoh, Tokyo (JP); Hirokazu Murata, Tokyo (JP); Masataka Takeuchi, Tokyo (JP); Jan Gilleir, Brussels (BE); Kris Driesen, Brussels (BE); Stijn Put, Brussels (BE)

(73) Assignees: SHOWA DENKO K.K., Tokyo (JP); UMICORE, Brussels (BE)

( * ) Notice: Subject to any disclaimer, the term of this patent is extended or adjusted under 35 U.S.C. 154(b) by 585 days.

(21) Appl. No.: 14/909,755

(22) PCT Filed: Aug. 4, 2014

(86) PCT No.: PCT/JP2014/070457
§ 371 (c)(1),
(2) Date: Feb. 3, 2016

(87) PCT Pub. No.: WO2015/019993
PCT Pub. Date: Feb. 12, 2015

(65) Prior Publication Data
US 2016/0181602 A1    Jun. 23, 2016

(30) Foreign Application Priority Data
Aug. 5, 2013    (JP) .................................. 2013-162832

(51) Int. Cl.
*H01M 4/583*    (2010.01)
*H01M 4/48*    (2010.01)
(Continued)

(52) U.S. Cl.
CPC ............... *H01M 4/48* (2013.01); *C01B 32/05* (2017.08); *H01M 4/364* (2013.01); *H01M 4/386* (2013.01);
(Continued)

(58) Field of Classification Search
CPC ... C01B 32/05; H01M 10/0525; H01M 4/364; H01M 4/386; H01M 4/387; H01M 4/48; H01M 4/583
See application file for complete search history.

(56) References Cited

U.S. PATENT DOCUMENTS

| 6,623,888 B1 | 9/2003 | Omaru et al. |
| 7,785,661 B2 | 8/2010 | Carel et al. |

(Continued)

FOREIGN PATENT DOCUMENTS

| CN | 1742397 A | 3/2006 |
| CN | 101632187 A | 1/2010 |

(Continued)

OTHER PUBLICATIONS

Madokoro et al. Translation of JP 2008-235247. Obtained online from JPO/AIPN website on Mar. 27, 2017.*

(Continued)

*Primary Examiner* — Michael A Salvitti
(74) *Attorney, Agent, or Firm* — Sughrue Mion, PLLC

(57) ABSTRACT

A production method for a composite of fine particles (A) and carbon particles (B), including the steps of: mixing fine particles (A) formed of a substance comprising at least one kind of Si, Sn, Al, Ge and In; and molten pitch, to obtain a mixture (1); pulverizing the mixture (1) to obtain a pulverized product (2a); dry-mixing the pulverized product (2a) and carbon particles (B) to obtain a mixture (3a); and firing the mixture (3a), followed by pulverization; or including the steps of: adding carbon particles (B) to the mixture (1), (Continued)

followed by dry mixing and pulverizing, to obtain a pulverized product (2*b*); and firing the pulverized product (2*b*), followed by pulverization.

18 Claims, 1 Drawing Sheet

(51) Int. Cl.
    *H01M 4/36*     (2006.01)
    *H01M 4/38*     (2006.01)
    *C01B 32/05*     (2017.01)
    *H01M 10/0525*     (2010.01)

(52) U.S. Cl.
    CPC ........... *H01M 4/387* (2013.01); *H01M 4/583* (2013.01); *H01M 10/0525* (2013.01)

(56) References Cited

U.S. PATENT DOCUMENTS

| | | | |
|---|---|---|---|
| 2005/0074672 A1 | 4/2005 | Matsubara et al. | |
| 2007/0087268 A1 | 4/2007 | Kim et al. | |
| 2013/0136986 A1 | 5/2013 | Scoyer et al. | |

FOREIGN PATENT DOCUMENTS

| | | | |
|---|---|---|---|
| CN | 102958835 A | | 3/2013 |
| JP | 10-3920 A | | 1/1998 |
| JP | 11-40158 A | | 2/1999 |
| JP | 2000-272911 A | | 10/2000 |
| JP | 2003-089511 A | | 3/2003 |
| JP | 2003-297355 | * | 10/2003 |
| JP | 2003-297355 A | | 10/2003 |
| JP | 2004-213927 A | | 7/2004 |
| JP | 2005-108774 A | | 4/2005 |
| JP | 2005-243508 A | | 9/2005 |
| JP | 2007-115687 A | | 5/2007 |
| JP | 2008-186732 A | | 8/2008 |
| JP | 2008-235247 | * | 10/2008 |
| JP | 2008-282819 A | | 11/2008 |
| JP | 2013-20899 A | | 1/2013 |
| JP | 2013-80780 A | | 5/2013 |
| KR | 10-2009-0086456 A | | 8/2009 |
| KR | 10-2013-0040198 A | | 4/2013 |
| WO | 95/028011 A1 | | 10/1995 |
| WO | 2005/031898 A1 | | 4/2005 |
| WO | 2008/102712 A1 | | 8/2008 |

OTHER PUBLICATIONS

Sasaki. Translation of JP 2003-297355. Obtained online from JPO/AIPN website on Mar. 27, 2017.*
Klauser et al., "Oxidation study of silicon nanoparticle thin films on HOPG", Surface Science, Aug. 15, 2009, vol. 603, pp. 2999-3004.
Communication dated Nov. 22, 2016 from the European Patent Office in counterpart Application No. 14833869.2.
International Search Report of PCT/JP2014/070457 dated Oct. 28, 2014 [PCT/ISA/210].
Communication dated Mar. 29, 2017 from the State Intellectual Property Office of People's Republic of China in counterpart Application No. 201480044864.1.
Communication dated Oct. 15, 2018 from the European Patent Office in counterpart application No. 14 833 869.2.
Communication dated Jul. 3, 2017, from the Korean Intellectual Property Office in counterpart Korean application No. 10-2016-7001344.

* cited by examiner

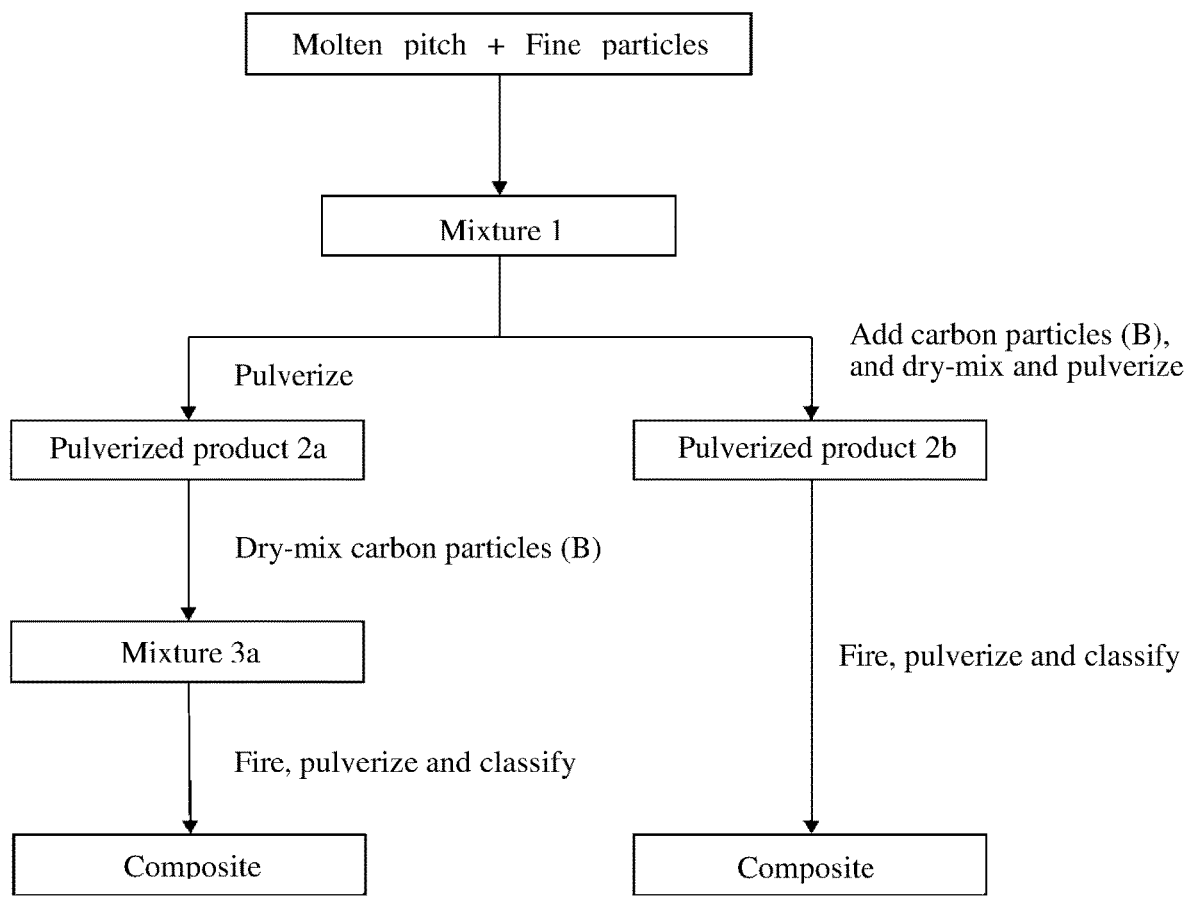

METHOD FOR PRODUCING COMPOSITE, AND NEGATIVE ELECTRODE MATERIAL FOR LITHIUM ION BATTERY

CROSS REFERENCE TO RELATED APPLICATIONS

This application is a National Stage of International Application No. PCT/JP2014/070457, filed Aug. 4, 2014, claiming priority based on Japanese Patent Application No. 2013-162832, filed Aug. 5, 2013, the contents of all of which are incorporated herein by reference in their entirety.

TECHNICAL FIELD

The present invention relates to a production method for a composite of fine particles containing Si, Sn or the like and a carbonaceous material. Specifically, the present invention relates to a production method for a composite which can be used as a negative electrode material for a lithium ion battery.

BACKGROUND ART

Multi-functionalization of a portable electronic device has proceeded faster than power saving of an electronic component. Therefore, the portable electronic device has been increased in power consumption. In consequence, a lithium ion battery serving as a main power supply of the portable electronic device has been required to have a high capacity and a small size more strongly than ever before. In addition, along with growing demand for an electric vehicle, also a lithium ion battery to be used in the electric vehicle has been strongly required to have a high capacity.

Graphite has hitherto been mainly used as a negative electrode material for the lithium ion battery. Graphite exhibits excellent cycle characteristics, but can stoichiometrically occlude lithium only up to a ratio of $LiC_6$. Therefore, a theoretical capacity of a graphite negative electrode is 372 mAh/g.

In order to realize a high capacity of the lithium ion battery, an investigation has been made on using particles containing a metal element having a high theoretical capacity, such as Si or Sn, for the negative electrode material. For example, the theoretical capacity of a lithium ion battery using particles containing Si for the negative electrode material is 4,200 mAh/g. The theoretical capacity of a lithium battery using metal lithium for a negative electrode is 3,900 mAh/g, and hence it is expected that a lithium ion battery having a smaller size and a higher capacity than those of the lithium battery is obtained when Si or the like can be used for the negative electrode material. However, the negative electrode material, such as Si, shows a high expansion rate and a high contraction rate in association with intercalation and deintercalation (occlusion and release) of lithium ions. Therefore, a capacity as high as that expected is not obtained owing to a gap generated between the particles. In addition, the particles are broken to be finer through repetition of great expansion and contraction. Therefore, electrical contact is disrupted and hence internal resistance increases. In consequence, the lithium ion battery to be obtained has a drawback of a short charge-discharge cycle lifetime.

In view of the foregoing, various composite negative electrode materials each combining a carbonaceous material and Si have been proposed. For example, there have been proposed: a composite material prepared by immobilizing Si ultrafine particles onto the surfaces of graphite particles, and mixing petroleum mesophase pitch therewith, followed by carbonization (Patent Document 1); a composite material prepared by mechanically pulverizing Si powder and natural graphite with a planetary ball mill to embed Si in the graphite, and then dissolving a carbon fiber and coal tar pitch in THF, followed by carbonization (Patent Document 2); a composite material prepared by mixing spherical natural graphite, Si, and PVA serving as a pore forming agent, and mixing binder pitch therewith under heating, followed by carbonization, and further mixing binder pitch and acetylene black therewith, followed by carbonization (Patent Document 3); a composite material prepared by mixing Si and powder pitch, and further dry-mixing artificial graphite therewith, followed by two-stage firing of tar removal at 600° C. and carbonization at 900° C. (Patent Document 4); and a composite material prepared by mixing a solution in which graphite is dispersed in xylene, a solution in which petroleum pitch is dispersed in xylene, and a solution in which pitch and Si are dispersed in xylene, followed by carbonization (Patent Document 5).

In addition, there has been proposed a production method characterized by including the steps of: mixing raw materials comprising a silicon-containing carbon precursor and carbonaceous spherules; subjecting the mixture obtained in the previous step to heat treatment at from 400° C. to 700° C.; and performing carbonization treatment at from 800° C. to 1,200° C. (Patent Document 6).

Further, there has been proposed a production method including: mixing and kneading flake natural graphite, Si, and coal tar pitch in tar middle oil as a solvent with a biaxial kneader; firing the resultant at 450° C.; applying a compressive force and a shear force with Mechanofusion (trademark) system; and firing the resultant at 1,000° C. (Patent Document 7).

PRIOR ART

Patent Documents

[Patent Document 1] JP 2005-108774 A (US 2005/074672 A1)
[Patent Document 2] JP 2000-272911 A
[Patent Document 3] JP 2008-186732 A
[Patent Document 4] JP 2004-213927 A
[Patent Document 5] U.S. Pat. No. 7,785,661 B2
[Patent Document 6] JP 2003-89511 A
[Patent Document 7] JP 2005-243508 A

DISCLOSURE OF THE INVENTION

Problem to be Solved by the Invention

In Patent Document 6, a volatile component (tar component) can be released through the heat treatment at a low temperature of from 400° C. to 700° C. In addition, it is expected that such effect that pores in a final carbon material can be controlled to be small is obtained through appropriate control of a temperature increase rate and a retention time period in the heat treatment. However, in the mixture subjected to the heat treatment at low temperature, the bonding between the carbonaceous spherules each serving as a core material and the silicon-containing carbon precursor serving as a coating layer is insufficient. Therefore, when the mixture subjected to the heat treatment at a low temperature of from 400° C. to 700° C. is pulverized, the coating layer is peeled off. As a result, the mixture is liable to be separated through the subsequent carbonization treatment at from 800° C. to 1,200° C.: i.e. one is a core material in which the surface thereof is partially coated with a silicon-containing carbonaceous material and the other is a finely pulverized silicon-containing carbonaceous material. The finely pulverized silicon-containing carbonaceous material causes an increase in electrical resistance owing to low conductivity, and promotes decomposition of an electrolytic solution owing to a large specific surface area. Thus, battery characteristics are liable to deteriorate.

Also in the case of Patent Document 7, a coating layer is liable to be peeled off when a mixture subjected to heat treatment at low temperature as described above is pulverized. As a result, the composite material is liable to cause deterioration in battery characteristics.

An object of the present invention is to provide a material exhibiting excellent characteristics as a negative electrode material for a lithium ion battery.

Means to Solve the Problem

The present invention provides the following items.

[1] A production method for a composite of fine particles (A) and carbon particles (B), comprising the steps of:
mixing fine particles (A) formed of a substance comprising at least one kind of Si, Sn, Al, Ge and In; and molten pitch, to obtain a mixture 1;
pulverizing the mixture 1 to obtain a pulverized product 2a;
dry-mixing the pulverized product 2a and carbon particles (B) to obtain a mixture 3a; and
firing the mixture 3a at a firing temperature of 800° C. or more and 1,200° C. or less, followed by pulverization.

[2] A production method for a composite of fine particles (A) and carbon particles (B), comprising the steps of:
mixing fine particles (A) formed of a substance comprising at least one kind of Si, Sn, Al, Ge and In; and molten pitch, to obtain a mixture 1;
adding carbon particles (B) to the mixture 1, followed by dry mixing and pulverizing, to obtain a pulverized product 2b; and
firing the pulverized product 2b at a firing temperature of 800° C. or more and 1,200° C. or less, followed by pulverization.

[3] The production method for a composite according to [1] or [2] above, in which first heat treatment for removing a tar component is not performed before the firing step.

[4] The production method according to any one of [1] to [3] above, in which the fine particles (A) are silicon particles each having a SiOx layer (0<x≤2) on a surface of the particle, have an oxygen content ratio of 1 mass % or more and 18 mass % or less, and contain, as a main component, particles each having a primary particle diameter of 200 nm or less.

[5] The production method according to any one of [1] to [4] above, in which the step of obtaining the pulverized product 2a or 2b comprises a step of performing the pulverizing with at least one of a ball mill, a jet mill, a rod mill, a pin mill, a rotary cutter mill, a hammer mill, an atomizer, or a mortar.

[6] The production method according to any one of [1] to [5] above, in which the carbon particles (B) are graphite particles.

[7] The production method according to any one of [1] to [6] above, in which the pitch has a softening point of 80° C. or more and 300° C. or less.

[8] The production method according to any one of [1] to [7] above, in which the carbon particles (B) have a 50% particle diameter (D50) in a volume-based cumulative particle size distribution measured with a laser diffraction particle size distribution measuring apparatus of 2 μm or more and 50 μm or less.

[9] The production method according to any one of [1] to [8] above, in which a total mass of a component derived from the pitch after the firing and the carbon particles (B) is twice or more and ten times or less as large as a mass of the fine particles (A).

[10] The production method according to any one of [1] to [9] above, in which a mass ratio of a component derived from the pitch after the firing with respect to the fine particles (A) is 0.1 or more and 10 or less.

[11] A negative electrode material for a lithium ion battery, comprising a composite produced by the production method described in any one of [1] to [10] above.

[12] A lithium ion battery, comprising a negative electrode formed of the negative electrode material described in [11] above.

Effects of the Invention

According to the production method of the present invention, a negative electrode material exhibiting a large discharge amount per mass can be obtained. In addition, through use of the negative electrode material obtained, a lithium ion battery having a high capacity and excellent charge-discharge cycle characteristics can be produced.

BRIEF DESCRIPTION OF THE DRAWINGS

FIG. 1 is a flowchart of a production example of a composite.

MODE FOR CARRYING OUT THE INVENTION

In a preferred embodiment of the present invention, a composite can be produced by a method schematically illustrated in FIG. 1.

(1) Mixing of Fine Particles (A) and Pitch

In a preferred embodiment of the present invention, first, a mixture 1 of fine particles (A) and pitch is prepared. The mixture 1 is preferably prepared by mixing molten pitch and the fine particles (A) in an inert atmosphere while applying a compressive force and a shear force. Through the mixing under a state in which a compressive force and a shear force are applied, the fine particles (A) can be more uniformly dispersed in the pitch.

Examples of the inert atmosphere include a nitrogen atmosphere and an argon atmosphere, and a nitrogen atmosphere is preferred. Through the mixing in the inert atmosphere, alteration of the pitch due to its oxidation can be prevented.

The pitch and the fine particles (A) may be mixed after melting the pitch, or the pitch and the fine particles (A) may be mixed before melting the pitch, followed by melting the pitch through heating.

As a method of melting the pitch, there is given a method comprising placing the pitch in a container and increasing temperature to a temperature higher than the softening point of the pitch with a mantle heater or an oil bath.

A known mixer may be used as a mixer for mixing under a state in which a compressive force and a shear force are applied. For a stirring operation of a high-viscosity liquid, an appropriate mixer is selected depending on the viscosity and shear characteristic value of the liquid (an indicator of an average shear amount of the liquid by a blade per revolution). Examples of the mixer include a biaxial kneader and Mechanofusion (trademark) system, and the mixing under a state in which a compressive force and a shear force are applied can be realized through use of these mixers.

In addition, the mixer may play a role not only in uniformly mixing components, but also in pulverizing the components at the same time. The pulverization only needs to allow a solid material to be finer through application of a compressive force, an impact force, a shear force, or a frictional force by a mechanical method. Examples of such mixer may include a high-speed rotation mill, a tumbling ball mill, a vibrating ball mill, a planetary mill, a medium stirring-type mill, and an air flow-type pulverizer.

The mixture 1 is obtained by performing solidification after the mixing.

The fine particles (A) are formed of a substance containing an element capable of storing and releasing lithium ions. It is a matter of course that the fine particles (A) mean particles except carbon particles (B) described below. Examples of the element capable of storing and releasing lithium ions include Si, Sn, Al, Ge, and In. Examples of the fine particles (A) include a simple substance of those elements, a compound containing those elements, and a compound, a mixture, a eutectic material, and a solid solution each containing at least two kinds of those elements. In addition, the fine particles (A) may be an aggregate of a plurality of ultrafine particles. The fine particles (A) each have a form of, for example, an aggregated form, a flake shape, a spherical shape, or a fibrous form. Of those, a spherical shape or an aggregated form is preferred. The fine particles (A) may be made into secondary particles.

As a substance containing a Si element, there is given a substance represented by the formula: $M^a_m Si$. The substance is a compound, a mixture, a eutectic material, or a solid solution containing element $M^a$ at a ratio of m mol with respect to 1 mol of Si.

$M^a$ represents an element except Li. Specific examples of the element represented by $M^a$ include Si, B, C, N, O, S, P, Na, Mg, Al, K, Ca, Ti, V, Cr, Mn, Fe, Co, Ni, Cu, Zn, Mo, Ru, Rh, Pd, Pt, Be, Nb, Nd, Ce, W, Ta, Ag, Au, Cd, Ga, In, Sb, and Ba. It should be noted that $M^a$ represents an elemental Si when $M^a$ is Si. In the formula, m represents preferably 0.01 or more, more preferably 0.1 or more, still more preferably 0.3 or more.

Specific examples of the substance containing a Si element include: an elemental Si; an alloy of Si and an alkaline earth metal; an alloy of Si and a transition metal; an alloy of Si and a semimetal; a solid solution-type alloy or eutectic alloy of Si and Be, Ag, Al, Au, Cd, Ga, In, Sb, or Zn; silicides such as $CaSi$, $CaSi_2$, $Mg_2Si$, $BaSi_2$, $Cu_5Si$, $FeSi$, $FeSi_2$, $CoSi_2$, $Ni_2Si$, $NiSi_2$, $MnSi$, $MnSi_2$, $MoSi_2$, $CrSi_2$, $Cr_3Si$, $TiSi_2$, $Ti_5Si_3$, $NbSi_2$, $NdSi_2$, $CeSi_2$, $WSi_2$, $W_5Si_3$, $TaSi_2$, $Ta_5Si_3$, $PtSi$, $V_3Si$, $VSi_2$, $PdSi$, $RuSi$ and $RhSi$; and $SiO_2$, $SiC$, and $Si_3N_4$.

In a preferred embodiment of the present invention, the fine particles (A) are silicon-containing particles. Examples of the silicon-containing particles include silicon particles each having a SiOx layer (0<x≤2) on a particle surface, and may include particles in which the whole of the particles is formed of the SiOx layer (0<x<2). In addition, the fine particles may contain therein pure silicon particles.

The average thickness of the SiOx layer is preferably 0.5 nm or more and 10 nm or less. When the average thickness is 0.5 nm or more, the fine particles can be in a stable state in which further oxidation does not occur on a surface portion upon exposure to air or an oxidizing gas. In addition, when the average thickness is 10 nm or less, an increase in irreversible capacity in initial stage cycles can be suppressed. The average thickness is measured through a TEM photograph.

The oxygen content ratio of the fine particles (A) in the entirety of the particles is preferably 1 mass % or more and 18 mass % or less, more preferably 2 mass % or more and 10 mass % or less. The oxygen content ratio may be quantified by, for example, inductively coupled plasma (ICP).

Such silicon-based particles may be produced by, for example, a method disclosed in WO 2012/000858 A1.

As a substance containing a Sn element, there are given, for example, an elemental tin, tin alloy, tin oxide, tin sulfide, tin halide, and stannide. Specific examples of the substance containing a Sn element include: an alloy of Sn and Zn, an alloy of Sn and Cd, an alloy of Sn and In, and an alloy of Sn and Pb; tin oxides such as $SnO$, $SnO_2$, and $M^b_4 SnO_4$ ($M^b$ represents a metal element except Sn); tin sulfides such as $SnS$, $SnS_2$, and $M_2SnS_3$; tin halides, such as $SnX_2$, $SnX_4$ and $M^b SnX_4$ ($M^b$ represents a metal element expect Sn, and X represents a halogen atom); and stannides such as $MgSn$, $Mg_2Sn$, $FeSn$, $FeSn_2$, $MoSn$ and $MoSn_2$.

The fine particles (A) contain, as a main component, particles each having a primary particle diameter of 200 nm or less. Herein, the "primary particle diameter" may be measured through micrograph observation with a SEM, a TEM, or the like, and the "main component" means that, in at least one field in the micrograph observation, 90% (number-based) or more of primary particles each have a diameter of 200 nm or less.

In addition, the silicon-containing particles have an average particle diameter $d_{av}$ of the primary particles calculated by the following equation of preferably 30 nm or more and 150 nm or less, more preferably 40 nm or more and 120 nm or less.

$$d_{av}=6/(\rho \times BET)$$

On the assumption that the fine particles (A) are dense spheres having an average diameter $d_{av}$ BET: BET specific surface area ($m^2/g$) based on nitrogen adsorption $\rho$: true density of silicon particles (2.33 $g/cm^3$ as a theoretical value)

The same holds true for other fine particles (A).

When the average particle diameter falls within the above-mentioned range, volume strain in association with intercalation of Li into a Si crystal phase can be reduced, and hence expansion and contraction in association with charge and discharge, which are the greatest drawback in the case of using Si for a negative electrode active material, can be suppressed.

Any of a petroleum-derived substance, such as tar or petroleum pitch generated as a by-product in ethylene production; and a coal-derived substance, such as coal tar generated in coal dry distillation, a heavy component obtained by removing a low-boiling-point component from the coal tar by distillation, or coal tar pitch (coal pitch), may be used as the pitch, but petroleum-based pitch or coal-based pitch is preferred, and petroleum-based pitch is particularly preferred.

The pitch is an aggregate of polycyclic aromatic compounds, and has advantages in that a carbonization yield is high as compared to the case of using a monomer as a starting material, the amounts of impurities are small, and further, the fine particles (A) are less liable to be oxidized by virtue of a small oxygen content.

The softening point of the pitch is preferably 80° C. or more and 300° C. or less. When the softening point of the pitch is low, the average molecular weight of the polycyclic aromatic compounds constituting the pitch is low, resulting in a low carbonization yield and an increase in production cost. Besides, such pitch comprises a carbon coating layer having a porous structure because the pitch contains a volatile component in a large amount, and hence the pitch tends to cause an increase in irreversible capacity when the pitch serves as an active material for a battery owing to a large specific surface area. When the softening point of the pitch is too high, the pitch has an advantage of a high carbonization yield by virtue of a high average molecular weight of the polycyclic aromatic compounds constituting the pitch, but in general, pitch having a high softening point has a high viscosity, and hence it tends to be difficult to uniformly disperse each component in the mixture of the fine particles (A) and the pitch or in the mixture of the fine particles (A), the pitch, and the carbon particles (B) by melting the pitch. When the softening point of the pitch falls within the above-mentioned range, the fine particles (A) and the pitch, or the fine particles (A), the pitch, and the carbon particles (B) are uniformly mixed, and a composite exhibiting suitable characteristics as the active material for a battery can be obtained.

The softening point of the pitch may be measured by a Mettler method described in ASTM-D3104-77.

The actual carbon ratio of the pitch is preferably 20 mass % or more and 70 mass % or less, more preferably 30 mass % or more and 60 mass % or less. When the actual carbon ratio is low, the production cost tends to be increased. Besides, such pitch offers a carbon coating layer having a porous structure because the pitch contains the volatile component in a large amount, and hence the pitch tends to cause an increase in irreversible capacity when it serves as the active material for a battery owing to a large specific surface area. When the actual carbon ratio is too high, the pitch has an advantage of a high carbonization yield, but in general, pitch having a high actual carbon ratio has a high viscosity, and hence it tends to be difficult to uniformly disperse each component in the mixture of the fine particles (A) and the pitch or in the mixture of the fine particles (A), the pitch, and the carbon particles (B) by melting the pitch. When the actual carbon ratio falls within the above-mentioned range, the fine particles (A) and the pitch, or the fine particles (A), the pitch, and the carbon particles (B) are uniformly mixed, and the composite exhibiting suitable characteristics as the active material for a battery can be obtained.

The actual carbon ratio is defined as a ratio of an actual amount with respect to a loaded amount, the actual amount being obtained through thermal analysis measurement at 1,100° C. under a nitrogen gas flow after pulverization of the pitch in a solid form with a mortar or the like. The actual carbon ratio is identical to a fixed carbon content in JIS K2425 measured at a carbonization temperature of 1,100° C.

The pitch preferably has a QI (quinolone insoluble) content of from 0 mass % to 30 mass % and a TI (toluene insoluble) content of 10 mass % or more and 70 mass % or less.

The QI content of the pitch corresponds to its free carbon amount. When pitch containing a large amount of free carbon is subjected to heat treatment, the carbon adheres onto the surfaces of mesophase spheres in the course of appearance of the mesophase spheres, to form a three-dimension network and thus prevent the growth of the spheres. Thus, a mosaic structure is formed. In contrast, when pitch containing a small amount of free carbon is subjected to the heat treatment, the mesophase spheres grow larger to form needle coke. When the QI content falls within the above-mentioned range, electrode characteristics are more satisfactory.

In addition, when the TI content is small, the average molecular weight of the polycyclic aromatic compounds constituting the pitch is low, resulting in a low carbonization yield and an increase in production cost. Besides, such pitch comprises a carbon coating layer having a porous structure because the pitch contains the volatile component in a large amount, and hence the pitch tends to cause an increase in irreversible capacity when it serves as the active material for a battery owing to a large specific surface area. When the TI content is too large, the pitch has an advantage of a high carbonization yield by virtue of a high average molecular weight of the polycyclic aromatic compounds constituting the pitch, but in general, pitch having a large TI content has a high viscosity, and hence it tends to be difficult to uniformly disperse each component in the mixture of the fine particles (A) and the pitch or in the mixture of the fine particles (A), the pitch, and the carbon particles (B) by melting the pitch. When the TI content falls within the above-mentioned range, the fine particles (A) and the pitch, or the fine particles (A), the pitch, and the carbon particles (B) are uniformly mixed, and a composite exhibiting suitable characteristics as the active material for a battery can be obtained.

The QI content and TI content of the pitch may be measured by a method disclosed in JIS K2425 or a method in conformity thereto.

The blending ratio of the pitch to the fine particles (A) is as follows: the ratio of the mass of a component derived from the pitch after carbonization firing described below is preferably 0.1 or more and 10 or less, more preferably 0.3 or more and 5 or less, with respect to the mass of the fine particles (A). When the blending ratio of the pitch is too low, the surfaces of the carbon particles (B) cannot each be coated with a coating layer including the fine particles (A), and the component derived from the pitch and the fine particles cannot be bonded sufficiently in some cases. In such cases, an effect of imparting conductivity to the fine particles (A) cannot be obtained sufficiently, or an effect of reducing the expansion of the fine particles (A) given by the coating layer becomes insufficient. As a result, battery characteristics are liable to deteriorate. In contrast, when the blending ratio of the pitch is too high, the initial irreversible capacity becomes high owing to the coating layer formed of amorphous carbon. As a result, the battery characteristics are liable to deteriorate.

It should be noted that, in the case where the carbonization firing is performed under the same conditions as the evaluation conditions for the actual carbon ratio, the mass of the component derived from the pitch after the carbonization firing may be equal to a value obtained by multiplying the mass of the pitch by the actual carbon ratio.

(2) Mixing and Pulverization with Carbon Particles (B)

A method of mixing the mixture 1 and carbon particles (B) is preferably performed by the following procedure 1 or 2: a procedure 1 (left side in FIG. 1) comprising pulverizing the mixture 1 to obtain a pulverized product 2a, and then dry-mixing the pulverized product 2a and the carbon particles (B) to obtain a mixture 3a; or a procedure 2 (right side in FIG. 1) comprising adding the carbon particles (B) to the mixture 1, followed by dry mixing and pulverizing, to obtain a pulverized product 2b.

In the case of employing the procedure 1, the carbonization is performed under the state in which the pulverized product 2a, which is formed into fine particles in advance, and the carbon particles (B) are uniformly mixed, and hence a composite in which the fine particles (A) are uniformly dispersed on the surfaces of the carbon particles (B) can be obtained. The same effect can be obtained also in the case of employing the procedure 2.

In the case of employing the procedure 2, there is a risk in that the carbon particles (B) themselves are pulverized in the mixing and pulverizing, and hence pulverization conditions need to be controlled depending on the kind of the carbon particles (B).

Procedure 1:

In the procedure 1, the mixture 1 is pulverized with a pulverizer such as a high-speed rotation mill, a tumbling ball mill, a vibrating ball mill, a planetary mill, a medium stirring-type mill, or an air flow-type pulverizer.

According to one preferred embodiment of the present invention, in order to dry-mix the resultant pulverized product 2a and the carbon particles (B), the pulverized product 2a and the carbon particles (B) are uniformly mixed under an inert gas atmosphere such as a nitrogen atmosphere. A mixer is not particularly limited, and examples thereof include a ball mill, a jet mill, a rod mill, a pin mill, a rotary cutter mill, a hammer mill, an atomizer, and a mortar.

According to another preferred embodiment of the present invention, in order to dry-mix the resultant pulverized product 2a and the carbon particles (B), the pulverized product 2a and the carbon particles (B) may be mixed under an inert gas atmosphere, such as a nitrogen atmosphere, while a compressive force and a shear force are applied. A mixer is not particularly limited also in this case, and examples thereof include a ball mill, a jet mill, a rod mill, a pin mill, a rotary cutter mill, a hammer mill, an atomizer, and a mortar. The mixing is conducted through use of those mixers under a state in which a compressive force and a shear force are applied.

Procedure 2:

In order to add the carbon particles (B) to the mixture 1 and perform dry mixing and pulverizing, the mixture 1 and the carbon particles (B) are preferably mixed under an inert gas atmosphere such as a nitrogen atmosphere, while a compressive force and a shear force are applied, as in the procedure 1. This step may be performed by, for example, the same method as that in the dry mixing in the procedure 1.

According to a preferred embodiment of the present invention, the carbon particles (B) are blended so that the total mass of the component derived from the pitch after the carbonization firing and the carbon particles (B) described below is twice or more and ten times or less as large as the mass of the fine particles (A). The total mass is more preferably 4 times or more and 8.7 times or less as large as the mass of the fine particles (A). When the total mass falls within the above-mentioned range, an active material for a battery excellent in balance between an increase in capacity exhibited by the fine particles (A) and a cycle characteristic retention rate exhibited by the carbon particles (B) can be obtained.

The carbon particles (B) are particles formed of a carbon material. The following material is used as the carbon material: a graphite material such as artificial graphite, pyrolytic graphite, expanded graphite, natural graphite, scaly graphite or flaky graphite; or a carbonaceous material having undeveloped crystals, such as graphitizable carbon, non-graphitizable carbon, glassy carbon, amorphous carbon, or low-temperature fired carbon.

The carbon particles (B) have a 50% particle diameter (D50) in a volume-based cumulative particle size distribution measured with a laser diffraction particle size distribution measuring apparatus of preferably 2 μm or more and 50 μm or less, more preferably 2 μm or more and 35 μm or less, still more preferably 3 μm or more and 25 μm or less. It should be noted that the measurement of the particle size distribution also includes the particle diameters of secondary particles.

When the carbon particles (B) contain a large amount of fine particles, it becomes difficult to increase an electrode density. In contrast, when the carbon particles (B) contain a large amount of large particles, there is a risk in that coating unevenness occurs on a negative electrode after application, and hence the battery characteristics deteriorate. Therefore, the carbon particles (B) preferably have a particle size distribution in which 90% or more of the particles on a number basis each have a particle diameter falling within a range of from 1 μm to 50 μm, and more preferably have a particle size distribution in which 90% or more of the particles on a number basis each have a particle diameter falling within a range of from 5 μm to 50 μm.

The carbon particles (B) have a 10% particle diameter (D10) in the volume-based cumulative particle size distribution measured with a laser diffraction particle size distribution measuring apparatus of preferably 1 μm or more, more preferably 2 μm or more.

It should be noted that carbon particles (B) formed of graphite particles each having a carbonaceous layer, carbon particles (B) formed of carbon-coated graphite particles each having a carbon fiber bound thereto, and carbon particles (B) formed of a carbonaceous material having undeveloped crystals described below preferably have particle diameters as described above.

[Carbon Particles (B) Formed of Graphite Material]

The carbon particles (B) are preferably graphite particles, more preferably artificial graphite particles.

The d002 of the graphite particles is preferably 0.360 nm or less, more preferably 0.345 nm or less. The Lc of the graphite particles is preferably 50 nm or more, more preferably 100 nm or more. It should be noted that the "d002" is an interlayer spacing determined from a 002 diffraction line in powder X-ray diffraction, and the "Lc" is a crystallite size along a c-axis determined from the 002 diffraction line in powder X-ray diffraction.

The graphite particles have a BET specific surface area of preferably from 1 $m^2/g$ to 10 $m^2/g$, more preferably from 1 $m^2/g$ to 7 $m^2/g$.

Coal-based coke and/or petroleum-based coke may be used as a raw material for the artificial graphite particles. In this case, the artificial graphite particles may be produced by subjecting the coal-based coke and/or petroleum-based coke to heat treatment at a temperature of preferably 2,000° C. or more, more preferably 2,500° C. or more. An upper limit of the heat treatment temperature is not particularly limited, but is preferably 3,200° C. The heat treatment is preferably performed under an inert atmosphere. The heat treatment may be performed by using an Acheson-type graphitization furnace or the like.

[Carbon Particles (B) Formed of Graphite Particles Each having Carbonaceous Layer]

The carbon particles (B) may be graphite particles each having on its surface a carbonaceous layer (hereinafter sometimes referred to as carbon-coated graphite particles).

The graphite particles are similar to the carbon particles (B) formed of a graphite material described above.

The carbonaceous layer on the surface has a ratio $I_D/I_G$ (R value) of an intensity ($I_D$) of a peak derived from an amorphous component within a range of from 1,300 cm$^{-1}$ to 1,400 cm to an intensity ($I_G$) of a peak derived from a graphite component within a range of from 1,580 cm$^{-1}$ to 1,620 cm$^{-1}$ in a Raman spectroscopic spectrum of preferably 0.01 or more, more preferably 0.04 or more. When a carbonaceous layer having a large R value, that is, a layer formed of an amorphous carbon material is formed on the surfaces of the graphite particles, intercalation and deintercalation of lithium ions are facilitated, and the rapid charge-discharge characteristics of a lithium ion battery are improved.

The carbon-coated graphite particles may be produced by a known method. For example, first, graphite powder is pulverized to yield graphite particles each finely pulverized into a predetermined size. Next, the graphite particles are stirred while an organic compound is sprayed. Alternatively, the graphite particles and an organic compound, such as pitch or a phenol resin, are mixed and subjected to mechanochemical treatment with a device such as Hybridizer (trademark) manufactured by Nara Machinery Co., Ltd.

The organic compound is not particularly limited, but isotropic pitch, anisotropic pitch, a resin, or a resin precursor or a monomer is preferred. In the case of using a resin precursor or a monomer, the resin precursor or the monomer is preferably polymerized to form a resin. A suitable example of the resin is at least one compound selected from the group consisting of a phenol resin, a polyvinyl alcohol resin, a furan resin, a cellulose resin, a polystyrene resin, a polyimide resin, and an epoxy resin. Of those, at least one selected from the group consisting of petroleum-based pitch, coal-based pitch, a phenol resin, a polyvinyl alcohol resin, a furan resin, a cellulose resin, a polystyrene resin, a polyimide resin, and an epoxy resin is preferred as the organic compound. The amount of the carbonaceous layer on the surfaces of the graphite particles may be adjusted by the adhesion amount of the organic compound. The adhesion amount of the organic compound is preferably from 0.05 part by mass to 40 parts by mass, more preferably from 0.1 part by mass to 30 parts by mass, with respect to 100 parts by mass of the graphite particles.

Next, the graphite particles onto which the organic compound adheres are subjected to heat treatment at preferably 200° C. or more and 2,000° C. or less, more preferably 500° C. or more and 1,500° C. or less, still more preferably 900° C. or more and 1,300° C. or less. Through the heat treatment, the carbon-coated graphite particles are obtained. When the heat treatment temperature is too low, carbonization of the organic compound is not sufficiently completed, and hydrogen or oxygen remains on the carbon particles (B) to adversely affect the battery characteristics in some cases. In contrast, when the heat treatment temperature is too high, crystallization excessively proceeds and there is a risk of reduction in charge characteristics. The heat treatment is preferably preformed under a non-oxidizing atmosphere. Examples of the non-oxidizing atmosphere include an atmosphere filled with an inert gas such as an argon gas or a nitrogen gas, and a vacuum state. In some cases, the carbon-coated graphite particles fuse with each other to form an aggregate through the heat treatment, and hence are preferably crushed so as to achieve the above-mentioned particle diameter in order to use the carbon-coated graphite particles for an electrode active material. In addition, the carbon-coated graphite particles have a BET specific surface area of preferably from 0.5 m$^2$/g to 30 m$^2$/g, more preferably from 0.5 m$^2$/g to 20 m$^2$/g.

[Carbon Particles (B) Formed of Graphite Particles Each having Carbon Fiber Bound Thereto]

The carbon particles (B) may be the above-mentioned graphite particles or carbon-coated graphite particles each having carbon fiber bound onto its surface.

A vapor grown carbon fiber is preferred as the carbon fiber. The average fiber diameter of the carbon fibers is preferably from 10 nm to 500 nm, more preferably from 50 nm to 300 nm, still more preferably from 70 nm to 200 nm, particularly preferably from 100 nm to 180 nm. When the average fiber diameter is too small, a handling property tends to be reduced.

The aspect ratio of the carbon fiber is not particularly limited, but is preferably from 5 to 1,000, more preferably from 5 to 500, still more preferably from 5 to 300, particularly preferably from 5 to 200. When the aspect ratio is 5 or more, the carbon fiber functions as a fibrous conductive material. When the aspect ratio is 1,000 or less, the handling property is satisfactory.

The vapor grown carbon fiber may be produced by introducing an organic compound serving as a raw material, such as benzene, together with a catalyst formed of an organic transition metal compound, such as ferrocene, into a reaction furnace at high temperature through use of a carrier gas, to subject the organic compound to vapor phase pyrolysis. As a production method, there is given, for example, a method comprising generating pyrolysis carbon fiber on a substrate (JP S60-27700 A), a method comprising generating pyrolysis carbon fiber in a floating state (JP S60-54998 A), or a method comprising growing pyrolysis carbon fiber on a reaction furnace wall (JP 2778434 B2). The vapor grown carbon fiber to be used in the present invention may be produced by those methods.

The vapor grown carbon fiber produced as described above may be directly used as a raw material for the carbon particles (B). However, in the carbon fiber in the state after vapor phase growth as it is, a pyrolysis product or the like resulting from the organic compound serving as a raw material adheres onto the surface of the fiber, or the carbon fiber has an undeveloped crystal structure in some cases. Therefore, in order to remove an impurity such as the pyrolysis product, or develop the crystal structure, the carbon fiber may be subjected to heat treatment under an inert gas atmosphere. In order to remove an impurity such as the pyrolysis product, the heat treatment is preferably performed at from about 800° C. to about 1,500° C. in an inert gas such as argon. In addition, in order to develop the crystal structure, the heat treatment is preferably performed at from about 2,000° C. to about 3,000° C. in an inert gas such as argon. In the heat treatment, a boron compound such as boron carbide (B$_4$C), boron oxide (B$_2$O$_3$), elemental boron, boric acid (H$_3$BO$_3$), or a borate, may be mixed as a graphitization catalyst with the vapor grown carbon fiber. The addition amount of the boron compound cannot unconditionally be specified because the addition amount depends on the chemical characteristics or physical characteristics of the boron compound to be used. For example, in the case of using boron carbide (B$_4$C), its addition amount desirably falls within a range of from 0.05 mass % to 10 mass %, preferably from 0.1 mass % to 5 mass %, with respect to the vapor grown carbon fiber. A commercially available product, such as "VGCF" (trademark; manufactured by Showa Denko K.K.), may be used as the vapor grown carbon fiber treated as described above.

A method of binding (bonding) the carbon fiber onto the surfaces of the graphite particles or the carbon-coated graphite particles is not particularly limited. For example, the carbon fiber is mixed with an organic compound, and the mixture is allowed to adhere onto the graphite particles or the carbon-coated graphite particles, followed by heat treatment. Thus, the carbon fiber can be bound to a carbonaceous layer in the course of formation of the carbonaceous layer. The amount of the carbon fiber is preferably from 0.1 part by mass to 20 parts by mass, more preferably from 0.1 part by mass to 15 parts by mass, with respect to 100 parts by mass of the graphite particles. When the carbon fiber is used in an amount of 0.1 part by mass or more, it can coat a considerable area of the surfaces of the graphite particles. The carbonaceous layer having conductivity connects the graphite particles and the carbon fiber, and hence contact resistance is small. When the carbon particles (B) formed of graphite particles each having carbon fiber bonded thereto are used, a higher effect of improving the battery characteristics is obtained as compared to the case of merely adding the carbon fiber to the electrode.

[Carbon Particles (B) Formed of Carbonaceous Material having Undeveloped Crystals]

The carbon particles (B) may be formed of a carbonaceous material having undeveloped crystals.

Herein, the "carbonaceous material having undeveloped crystals" refers to graphitizable carbon, non-graphitizable carbon, glassy carbon, amorphous carbon, low-temperature fired carbon, or the like. Those carbonaceous materials having undeveloped crystals may be prepared by a known method.

The following substance may be used as a raw material for the carbonaceous materials having undeveloped crystals: a petroleum-derived substance, such as thermal heavy oil, pyrolysis oil, straight asphalt, blown asphalt, raw coke, needle coke, calcined coke, or tar or pitch obtained as a by-product in producing ethylene; a coal-derived substance, such as coal tar produced in coal carbonization, a heavy component obtained by removing a low-boiling-point component from coal tar by distillation, coal-tar pitch, raw coke, needle coke, or calcined coke; a resin-derived substance of, for example, phenol resin, polyvinyl alcohol resin, furan resin, cellulose resin, polystyrene resin, polyimide resin or epoxy resin; or a plant-derived substance of, for example, coconut shells, chaff, used coffee grounds, bamboo charcoal, a broad-leaved tree, or a coniferous tree.

A method of producing the carbonaceous material having undeveloped crystals is not limited to one method. As a preferred production method, there is given a method comprising subjecting the above-mentioned raw material to carbonization treatment at preferably 800° C. or more and 1,500° C. or less, more preferably 1,000° C. or more and 1,500° C. or less under an inert atmosphere.

The d002 of the carbonaceous material having undeveloped crystals is preferably 0.400 nm or less, more preferably 0.385 nm or less, still more preferably 0.370 nm or less. A lower limit of the d002 is preferably 0.340 nm. In addition, the Lc of the carbonaceous material having undeveloped crystals is preferably 50 nm or less.

The carbonaceous material having undeveloped crystals has a BET specific surface area of preferably from 1 m$^2$/g to 10 m$^2$/g, more preferably from 1 m$^2$/g to 7 m$^2$/g.

(3) Firing and Pulverization

The mixture 3a obtained through the procedure 1 or the pulverized product 2b obtained through the procedure 2 is fired and pulverized.

The pitch contains a volatile component (tar component), which does not remain as a carbon skeleton after the carbonization, in a large amount. Therefore, the pitch may be subjected to first heat treatment for removing the tar component at from 400° C. to 800° C., followed by second heat treatment at 800° C. or more and 1,200° C. or less to perform carbonization. However, in view of the battery characteristics, it is advantageous to directly perform the heat treatment at 800° C. or more and 1,200° C. or less without performing the first heat treatment.

The "tar component" as used herein refers to a dark brown or brown viscous liquid substance which is generated through pyrolysis of organic matter and volatilizes at from about 400° C. to about 700° C.

In the firing, the mixture 3a or the pulverized product 2b is preferably directly subjected to carbonization firing without the first heat treatment. The firing may be performed through heating at a temperature of 800° C. or more and 1,200° C. or less under an inert atmosphere.

When the heat treatment temperature is too low, the carbonization of the pitch is not sufficiently completed, and hydrogen or oxygen remains on the carbon particles (B) to adversely affect the battery characteristics in some cases. In contrast, when the heat treatment temperature is too high, crystallization excessively proceeds and there is a risk of reductions in charge characteristics. Besides, the fine particles (A) are bonded to carbon to be inactive against Li, and there is a risk in that the fine particles (A) cannot contribute to charge and discharge. The heat treatment is preferably performed under a non-oxidizing atmosphere. An example of the non-oxidizing atmosphere is an atmosphere filled with an inert gas, such as an argon gas or a nitrogen gas. In some cases, the carbon-coated graphite particles fuse with each other to form an aggregate through the heat treatment, and hence are preferably crushed so as to achieve the above-mentioned particle diameter in order to use the carbon-coated graphite particles for the electrode active material.

After the firing, pulverization is performed. A device to be used for the pulverization only needs to allow a solid material to be finer through application of a compressive force, an impact force, a shear force, or a frictional force by a mechanical method. Examples of such device may include a high-speed rotation mill, a tumbling ball mill, a vibrating ball mill, a planetary mill, a medium stirring-type mill, and an air flow-type pulverizer. In the pulverization after the firing, in the case where there is a risk of breaking of the carbon particles (B) themselves or separation between the carbon particles (B) and the coating layer owing to a large compressive, impact, shear, or frictional force, the device may play a role only in crushing, not in pulverizing.

The composite has a 50% particle diameter (D50) in a volume-based cumulative particle size distribution measured with a laser diffraction particle size distribution measuring apparatus of preferably 2 μm or more and 50 μm or less, more preferably from 2 μm to 35 μm, still more preferably 3 μm or more and 25 μm or less, as in the case of producing the carbon particles (B) for the negative electrode active material for a battery. It should be noted that the measurement of the particle size distribution also includes the particle diameters of secondary particles.

When the composite contains a large amount of fine particles, it becomes difficult to increase the electrode density. Besides, an irreversible capacity resulting from decomposition of an electrolytic solution increases owing to a large specific surface area. In addition, permeation of the electrolytic solution is insufficient owing to the large specific surface area, and some of the particles are not utilized as the active material, resulting in a reduction in capacity. In contrast, when the composite contains a large amount of large particles, there is a risk in that coating unevenness occurs on the negative electrode after application, and hence the battery characteristics deteriorate. Therefore, the composite preferably has a particle size distribution in which 90% or more of the particles on a number basis each have a particle diameter falling within a range of from 1 μm to 50 μm, and more preferably has a particle size distribution in which 90% or more of the particles on a number basis each have a particle diameter falling within a range of from 5 μm to 50 μm.

The composite has a 10% particle diameter (D10) in the volume-based cumulative particle size distribution measured with a laser diffraction particle size distribution measuring apparatus of preferably 1 μm or more, more preferably 2 μm or more.

After the pulverization, it is preferred to perform classification to adjust the particle diameter to the above-mentioned particle diameter. The classification may be performed by sieving or any other method. There is no particular limitation on the classification as long as the classification enables adjustment of a particle size, and a known technology, such as a wind classifier, a circular sieve, a vibrating screen, a wave screen, a grizzly feeder, or a shake-out machine, may be utilized.

The amount of a carbonaceous layer on the surfaces of the carbon particles may be adjusted by the adhesion amount of the petroleum-based or coal-based pitch. The adhesion amount of the pitch is preferably from 0.05 part by mass to 50 parts by mass, more preferably from 0.1 part by mass to 30 parts by mass, with respect to 100 parts by mass of a mixture of the carbon particles and the fine particles (A).

The carbon coating layer derived from the pitch plays roles in imparting conductivity to the Si fine particles, which are each originally a semiconductor and have low conductivity, reducing the expansion and contraction of Si, and as well, uniformly dispersing the Si fine particles on the surface of the base carbonaceous material. The Si fine particles are liable to be aggregated through a van der Waals' force. However, the Si fine particles are each a semiconductor as described above, and hence when the Si fine particles are aggregated to be present in an electrically insulated state, the Si fine particles do not sufficiently contribute to charging and discharging. As a result, such Si fine particles cause, as an active material for a lithium ion secondary battery, undesirable characteristics, such as a reduction in capacity, deterioration in cycle characteristics, and deterioration in rate characteristics.

The coating layer is a layer for coating a core material, and hence it is important to measure the surface state of a negative electrode material obtained. As means for observing the surface of the negative electrode material, there is given, for example, observation of a surface shape with a SEM, evaluation of a coating layer thickness with a TEM, measurement of a specific surface area using various gas molecules such as nitrogen, carbon dioxide, helium and xenon as a probe gas, measurement of a true density using various gas molecules such as butanol or helium, as a probe gas, or evaluation of crystallinity on the surface of the negative electrode material by Raman scattering.

Of those, the following based on Raman scattering is generally performed: the ratio ($I_D/I_G$) of a peak intensity $I_D$ (derived from an amorphous component) around 1,360 cm$^1$ to a peak intensity $I_G$ (derived from a graphite component) around 1,580 cm$^{-1}$ is calculated to be used as an R value. When the surface of the negative electrode material is coated with amorphous carbon, the $I_D$ increases and the R value increases. In addition, also the measurement of a specific surface area using a nitrogen gas as a probe gas is generally performed. The R value preferably falls within a range of 0.1 or more and 1.0 or less. An excessively small R value indicates that the surfaces of the carbon particles (B) are not sufficiently coated with the coating layer including the fine particles (A), and the battery characteristics are liable to deteriorate because the bonding between the base carbonaceous material and the fine particles is insufficient, the effect of imparting conductivity to the fine particles (A) is not obtained, and further, the effect of reducing the expansion of the fine particles (A) generated by the coating layer is reduced. In contrast, an excessively large R value represents that the carbon particles (B) are coated with amorphous carbon leading to a high initial irreversible capacity, and the battery characteristics are liable to deteriorate also in this case.

(Negative Electrode Material)

The composite can be used as a negative electrode material for a battery.

(Paste for Negative Electrode)

A paste for a negative electrode according to one embodiment of the present invention comprises the negative electrode material, a binder, and a solvent, and as required, a conductive assistant or the like. The paste for a negative electrode is obtained by, for example, mixing and kneading the negative electrode material, the binder, and the solvent, and as required, the conductive assistant or the like. The paste for a negative electrode may be formed into a sheet shape, a pellet shape, or the like.

Examples of the binder include polyethylene, polypropylene, an ethylene propylene terpolymer, butadiene rubber, styrene butadiene rubber, butyl rubber, acrylic rubber, and a polymer compound having a large ionic conductivity. Examples of the polymer compound having a large ionic conductivity include polyvinylidene fluoride, polyethylene oxide, polyepichlorohydrin, polyphosphazene, and polyacrylonitrile. The amount of the binder is preferably from 0.5 part by mass to 100 parts by mass with respect to 100 parts by mass of the negative electrode material.

The conductive assistant is not particularly limited as long as the conductive assistant plays a role in imparting conductivity and electrode stability (buffering action on a volume change through intercalation and deintercalation of lithium ions) to the electrode. Examples thereof include vapor grown carbon fibers (e.g., "VGCF (trademark)" manufactured by Showa Denko K.K.), and conductive carbon (e.g., "DENKA BLACK (trademark)" manufactured by Denki Kagaku Kogyo Kabushiki Kaisha, "Super C65" manufactured by TIMCAL, "Super C45" manufactured by TIMCAL, or "KS6L" manufactured by TIMCAL). The amount of the conductive assistant is preferably from 10 parts by mass to 100 parts by mass with respect to 100 parts by mass of the negative electrode material.

The solvent is not particularly limited, and examples thereof include N-methyl-2-pyrrolidone, dimethylformamide, isopropanol and water. In the case of a binder using water as a solvent, a thickening agent is preferably used in combination. The amount of the solvent is adjusted so that the paste achieves such viscosity that the paste is easily applied onto a current collector.

(Negative Electrode Sheet)

A negative electrode sheet according to one embodiment of the present invention includes a current collector and an electrode layer for coating the current collector.

Examples of the current collector include a nickel foil, a copper foil, a nickel mesh, and a copper mesh.

The electrode layer contains a binder and the negative electrode material. The electrode layer may be obtained by, for example, applying the paste for a negative electrode, followed by drying. A method of applying the paste is not particularly limited. The thickness of the electrode layer is generally from 50 μm to 200 μm. When the thickness of the electrode layer is too large, the negative electrode sheet cannot be accommodated in a standardized battery container in some cases. The thickness of the electrode layer may be adjusted by the application amount of the paste. In addition, the thickness may also be adjusted by performing pressure forming after drying the paste. As a method for the pressure forming, there is given a forming method, such as roll pressure forming or press pressure forming. A pressure during the press forming is preferably from about 1 ton/cm$^2$ to about 5 ton/cm$^2$.

The electrode density of the negative electrode sheet may be calculated as described below. Specifically, the negative electrode sheet after the press forming is punched into a circular shape having a diameter of 16 mm, and its mass is measured. In addition, the thickness of an electrode is measured. The mass and thickness of the electrode layer can be understood by subtracting therefrom the mass and thickness of a current collector foil separately measured, and the electrode density is calculated based on the obtained values.

(Lithium Ion Battery)

A lithium ion battery according to one embodiment of the present invention comprises at least one selected from the group consisting of a non-aqueous electrolytic solution and a non-aqueous polymer electrolyte, a positive electrode sheet, and the negative electrode sheet.

A positive electrode sheet which has hitherto been used for a lithium ion battery, specifically, a sheet including a positive electrode active material may be used as the positive electrode sheet to be used in the present invention. Examples of the positive electrode active material include LiNiO$_2$, LiCoO$_2$, LiMn$_2$O$_4$, LiNi$_{0.34}$Mn$_{0.33}$Co$_{0.33}$O$_2$, and LiFePO$_4$.

The non-aqueous electrolytic solution and the non-aqueous polymer electrolyte used for the lithium ion battery are not particularly limited. Examples thereof include: organic electrolytic solutions each obtained by dissolving a lithium salt such as LiClO$_4$, LiPF$_6$, LiAsF$_6$, LiBF$_4$, LiSO$_3$CF$_3$, CH$_3$SO$_3$Li or CF$_3$SO$_3$Li, into a non-aqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran or γ-butyrolactone; gel polymer electrolytes each containing polyethylene oxide, polyacrylonitrile, polyvinylidene fluoride, polymethyl methacrylate, or the like; and a solid polymer electrolyte containing, for example, a polymer having an ethylene oxide bond.

In addition, a substance for causing a decomposition reaction in initial charging of the lithium ion battery may be added in a small amount to the electrolytic solution. Examples of the substance include vinylene carbonate (VC), biphenyl, propanesultone (PS), fluoroethylene carbonate (FEC) and ethylene sulfite (ES). The addition amount thereof is preferably from 0.01 mass % to 50 mass %.

In the lithium ion battery of the present invention, a separator may be provided between the positive electrode sheet and the negative electrode sheet. Examples of the separator include non-woven fabric, cloth, and a microporous film each containing as a main component polyolefin such as polyethylene or polypropylene, and a combination thereof.

EXAMPLES

The present invention is specifically described below by way of Examples and Comparative Examples. However, the present invention is by no means limited to these Examples.

Materials used in these examples are as described below.
(1) Fine Particles (A)
Si fine particles: Number-based average particle diameter of primary particle diameters calculated by the following equation: 50 nm $$d_{av}=6/(\rho \times \text{BET})$$

On the assumption that the fine particles (A) are dense spheres having an average diameter $d_{av}$ BET: BET specific surface area (m$^2$/g) based on nitrogen adsorption ρ: true density of silicon particles (2.33 g/cm$^3$ as a theoretical value)

Oxygen content in the Si fine particles measured with inductively coupled plasma (ICP): 5.8 mass %

Observation with an electron microscope showed that 90% (number-based) or more of primary particles each had a diameter of 200 nm or less.
(2) Pitch
Petroleum pitch (softening point: 220° C.)

Measurement by thermal analysis under a nitrogen gas flow showed that this petroleum pitch had an actual carbon ratio of 52% at 1,100° C.
(3) Carbon Particles (B)

Artificial graphite particles having the following physical properties.
10% particle diameter (D10): 2.5 μm,
BET specific surface area: 3.2 m$^2$/g,
d002: 0.3363 nm,
Lc: 61 nm,
50% particle diameter (D50): 5.1 μm,
90% particle diameter (D90): 12.3 μm, and
$I_D/I_G$ (R value): 0.06.

In the following examples, measurement methods for physical properties, a production method for a battery, an evaluation method for a negative electrode, and an evaluation method for a battery are as described below.
(Particle Diameter)

Two micro spatulas of powder and two drops of a nonionic surfactant (TRITON(trademark)-X; manufactured by Roche Applied Science) were added to 50 ml of water, and ultrasonically dispersed for 3 minutes. The dispersion was loaded in a laser diffraction particle size distribution measuring apparatus (LMS-2000e) manufactured by Seishin Enterprise Co., Ltd. and a volume-based cumulative particle size distribution was measured.

(Raman R Value)

The measurement was performed under the conditions of an excitation wavelength of 532 nm, an entrance slit width of 200 μm, an exposure time period of 15 seconds, a number of times of integration of 2, and a number of diffraction grating lines per millimeter of 600 through use of a laser Raman spectrometer (NRS-3100) manufactured by JASCO Corporation. The ratio ($I_D/I_G$) of a peak intensity $I_D$ (derived from an amorphous component) around 1,360 cm$^{-1}$ to a peak intensity $I_G$ (derived from a graphite component)

around 1,580 cm$^{-1}$ was calculated from the measured spectrum. The calculated value was defined as an R value and used as an indicator of a graphitization degree.

(d002 and Lc)

The interlayer spacing d002 and the crystallite size Lc along a c-axis were determined from a 002 diffraction line in powder X-ray diffraction.

(Production of Positive Electrode Sheet)

90 g of LiCoO$_2$, 5 g of carbon black (manufactured by TIMCAL) serving as a conductive assistant, and 5 g of polyvinylidene fluoride (PVdF) serving as a binder were stirred and mixed while N-methyl-pyrrolidone was appropriately added thereto. Thus, a slurry paste for a positive electrode was obtained.

The paste for a positive electrode was applied onto an aluminum foil having a thickness of 20 μm with a roll coater, followed by drying, to yield a sheet for a positive electrode. The electrode after the drying was pressed to a density of 3.6 g/cm with a roll press. Thus, a positive electrode sheet for battery evaluation was obtained.

(Production of Negative Electrode Sheet)

Polyacrylic acid (PAA) and carboxymethylcellulose (CMC) were prepared as binders. PAA in a white powder form was dissolved in purified water to yield a PAA solution. In addition, CMC in a white powder form was mixed with purified water, followed by stirring with a stirrer for a whole day and night, to yield a CMC solution.

Carbon black and a vapor grown carbon fiber (VGCF (trademark)-H, manufactured by Showa Denko K.K.) were prepared as conductive assistants, and a mixed conductive assistant obtained by mixing those assistants at a ratio of 3:2 (mass ratio) was used.

90 Parts by mass of each composite produced in Examples and Comparative Examples, 5 parts by mass of the mixed conductive assistant, the CMC solution containing 2.5 parts by mass of a solid content, and the PAA solution containing 2.5 parts by mass of a solid content were mixed, and an appropriate amount of water was added thereto for viscosity adjustment, followed by kneading with a planetary centrifugal mixer. Thus, a paste for a negative electrode was obtained.

The paste for a negative electrode was uniformly applied onto a copper foil having a thickness of 20 μm with a doctor blade so as to achieve a thickness of 150 μm, followed by drying with a hot plate and then vacuum drying. Thus, a sheet for a negative electrode was obtained. The electrode after the drying was pressed with a uniaxial press machine at a pressure of 3 ton/cm$^2$. Thus, a negative electrode sheet for battery evaluation was obtained.

(Discharge Capacity)

The negative electrode sheet for battery evaluation was punched into a circular shape having a diameter of 16 mmΦ. A half cell using Li as a counter electrode was produced, and a discharge capacity of a negative electrode material was measured.

(Capacity Ratio of Positive Electrode to Negative Electrode)

When a lithium ion battery is produced by allowing a positive electrode sheet and a negative electrode sheet to face each other, it is necessary to consider balance between the capacities of the electrodes. That is, when the capacity of a negative electrode, which is a lithium ion accepting side, is too low, Li excessively precipitates on the negative electrode side to cause deterioration in cycle characteristics. In contrast, when the capacity of the negative electrode is too high, an energy density is reduced through charge and discharge in a low load state, while the cycle characteristics are improved. In order to prevent the foregoing, the discharge amount of the negative electrode sheet per weight of an active material was evaluated in advance in a half cell using Li as a counter electrode, and the capacity of the negative electrode sheet was finely adjusted so that the ratio of the capacity of the negative electrode sheet ($Q_A$) to the capacity of the positive electrode sheet ($Q_c$) was a constant value of 1.2, while the same positive electrode sheet was used.

(Production of Battery for Evaluation)

The following operation was performed in a glove box in which a dry argon gas atmosphere having a dew point of −80° C. or less was retained.

The negative electrode sheet and the positive electrode sheet were punched to yield a negative electrode piece and a positive electrode piece each having an area of 20 cm$^2$, respectively. An Al tab and a Ni tab were attached to the Al foil of the positive electrode piece and the Cu foil of the negative electrode piece, respectively. A film microporous membrane made of polypropylene was sandwiched between the negative electrode piece and the positive electrode piece, and the resultant was packed in an aluminum laminate in this state. In addition, an electrolytic solution was injected thereinto. After that, an opening was sealed through heat fusion. Thus, a battery for evaluation was produced. It should be noted that the electrolytic solution was a solution obtained by mixing 1 mass % of vinylene carbonate (VC) and 30 mass % of fluoroethylene carbonate (FEC) with a solvent obtained by mixing ethylene carbonate, ethyl methyl carbonate, and diethyl carbonate at a ratio of 3:5:2 in terms of volume ratio, and further dissolving therein LiPF$_6$ as an electrolyte at a concentration of 1 mol/L.

(Charge-Discharge Cycle Test)

Aging was performed by repeating charge and discharge 5 times at a current value of 0.2 C, and then a charge-discharge cycle test was performed by the following method.

The charging was performed at an upper limit voltage of 4.2 V in a constant current (CC) mode at a current value of 1 C and a constant voltage (CV) mode at a cut-off current of 0.05 C.

The discharging was performed at a lower limit voltage of 2.8 V in a CC mode at a current value of 1 C.

The charging and discharging operations were performed 100 cycles when the above-mentioned charging and discharging operations were defined as 1 cycle, and a discharge capacity retention rate after the Nth cycle defined by the following equation was calculated.

(Discharge capacity retention rate after $N$th cycle (%))=(discharge capacity in $N$th cycle)/(discharge capacity in initial cycle)×100

Example 1

The fine particles (A) and the pitch were loaded in a separable flask so that the mass ratio between the fine particles (A) and the pitch after carbonization (calculated from an actual carbon ratio) was 10:6, and a temperature in the flask was increased up to 275° C. while an inert atmosphere was retained by allowing a nitrogen gas to flow. The pitch and the fine particles (A) were stirred while a compressive and shear force was applied through stirring with a dispersion mixer at 1,200 rpm. Thus, the fine particles (A) were uniformly mixed in the pitch. Next, the mixture was cooled to be solidified, to yield a mixture (mixture 1).

The mixture 1 was pulverized with a rotary cutter mill.

The resultant pulverized product and the carbon particles (B) were loaded in a rotary cutter mill so that the mass ratio between the fine particles (A) in the pulverized product and the carbon particles (B) was 10:84, and the contents were stirred at a speed as high as 25,000 rpm while an inert atmosphere was retained by allowing a nitrogen gas to flow. Thus, the mixture 1 was allowed to uniformly adhere onto the surfaces of the carbon particles (B).

The resultant was placed in a firing furnace, and subjected to carbonization firing by being retained at 1,100° C. for 1 hour under a nitrogen gas flow after the temperature was increased at a rate of 150° C./h. After that, the resultant was pulverized and then sieved with a 45 μm sieve. Thus, a composite was obtained.

The composite was evaluated for the discharge capacity and the cycle characteristics of a battery using the composite. The results are shown in Table 1.

Example 2

The mixture 1 prepared in the same manner as in Example 1 and the carbon particles (B) were loaded in a rotary cutter mill so that the mass ratio between the fine particles (A) in the mixture and the carbon particles (B) was 10:84, and the contents were stirred at a speed as high as 25,000 rpm while an inert atmosphere was retained by allowing a nitrogen gas to flow. Thus, the mixture 1 was allowed to uniformly adhere onto the surfaces of the carbon particles (B).

The resultant was placed in a firing furnace, and subjected to carbonization firing by being retained at 1,100° C. for 1 hour under a nitrogen gas flow after the temperature was increased at a rate of 150° C./h. After that, the resultant was pulverized and then sieved with a 45 μm sieve. Thus, a composite was obtained.

The composite was evaluated for the discharge capacity and the cycle characteristics of a battery using the composite.

The results are shown in Table 1.

Comparative Example 1

The mixture 1 prepared by the same method as that in Example 1 was placed in a firing furnace, and subjected to carbonization firing by being retained at 1,100° C. for 1 hour under a nitrogen gas flow. After that, the resultant was pulverized and then sieved with a 45 μm sieve.

The resultant fired product and the carbon particles (B) were loaded in a rotary cutter mill so that the mass ratio between the fine particles (A) in the fired product and the carbon particles (B) was 10:84, and the contents were stirred at a speed as high as 25,000 rpm while an inert atmosphere was retained by allowing a nitrogen gas to flow. Thus, the carbon particles (B) and the fired product were uniformly dispersed, and a composite was obtained.

The composite was evaluated for the discharge capacity and the cycle characteristics of a battery using the composite. The results are shown in Table 1.

Comparative Example 2

The fine particles (A), the pitch, and the carbon particles (B) were loaded in a separable flask so that the mass ratio among the fine particles (A), the pitch after carbonization (calculated from an actual carbon ratio), and the carbon particles (B) was 10:6:9, and a temperature in the flask was increased up to 275° C. while an inert atmosphere was retained by allowing a nitrogen gas to flow. The pitch, the fine particles (A), and the carbon particles (B) were stirred while a compressive and shear force was applied through stirring with a dispersion mixer at 1,200 rpm. Thus, the fine particles (A) and the carbon particles (B) were uniformly mixed in the pitch. Next, the mixture was cooled to be solidified, to yield a mixture.

The resultant mixture was placed in a firing furnace, and subjected to carbonization firing by being retained at 1,100° C. for 1 hour under a nitrogen gas flow. After that, the resultant was pulverized and then sieved with a 45 μm sieve.

After that, the fired product and the carbon particles (B) were loaded in a rotary cutter mill so that the mass ratio between the fine particles (A) in the fired product and the carbon particles (B) was 10:84, and the contents were stirred at a speed as high as 25,000 rpm while an inert atmosphere was retained by allowing a nitrogen gas to flow. Thus, each component was uniformly dispersed, and a composite was obtained.

The composite was evaluated for the discharge capacity and the cycle characteristics of a battery using the composite. The results are shown in Table 1.

Comparative Example 3

The fine particles (A), the pitch, and the carbon particles (B) were loaded in a rotary cutter mill so that the mass ratio among the fine particles (A), the pitch after carbonization (calculated from an actual carbon ratio), and the carbon particles (B) was 10:6:84, and the contents were stirred at a speed as high as 25,000 rpm while an inert atmosphere was retained by allowing a nitrogen gas to flow. Thus, each component was uniformly dispersed.

The resultant mixture was placed in a firing furnace, and subjected to carbonization firing by being retained at 1,100° C. for 1 hour under a nitrogen gas flow. After that, the resultant was pulverized and then sieved with a 45 μm sieve. Thus, a composite was obtained.

The composite was evaluated for the discharge capacity and the cycle characteristics of a battery using the composite. The results are shown in Table 1.

Comparative Example 4

The same method as that in Example 1 was performed in almost the same manner as in Example 1 except that tar removal treatment was performed before the firing.

Specifically, the mixture 1 was allowed to uniformly adhere onto the surfaces of the carbon particles (B) in the same manner as in Example 1.

The resultant was placed in a firing furnace, and subjected to tar removal by being retained at 550° C. for 1 hour under a nitrogen gas flow after the temperature was increased at a rate of 150° C./h. After that, the resultant was pulverized and then sieved with a 45 μm sieve, to yield a pulverized product. Next, the pulverized product was placed in a firing furnace, and subjected to carbonization firing by being retained at 1,100° C. for 1 hour under a nitrogen gas flow after the temperature was increased at a rate of 150° C./h. After that, the resultant was sieved with a 45 μm sieve. Thus, a composite was obtained.

The composite was evaluated for the discharge capacity and the cycle characteristics of a battery using the composite. The results are shown in Table 1.

Comparative Example 5

The fine particles (A), the pitch, and the carbon particles (B) were prepared so that the mass ratio among the fine particles (A), the pitch after carbonization (calculated from an actual carbon ratio), and the carbon particles (B) was 10:6:84, and were loaded in a planetary centrifugal mixer together with a quinoline/acetone mixed solvent, and stirred, followed by drying of the solvent. Thus, the carbon particles (B), the pitch, and the fine particles (A) were uniformly dispersed. The resultant was loaded in a rotary cutter mill, and stirred at a speed as high as 25,000 rpm while an inert atmosphere was retained by allowing a nitrogen gas to flow. Thus, each component was uniformly dispersed.

The resultant was placed in a firing furnace, and subjected to tar removal by being retained at 550° C. for 1 hour under a nitrogen gas flow after the temperature was increased at a rate of 150° C./h. After that, the resultant was pulverized and then sieved with a 45 μm sieve, to yield a pulverized product. Next, the pulverized product was placed in a firing furnace, and subjected to carbonization firing by being retained at 1,100° C. for 1 hour under a nitrogen gas flow after the temperature was increased at a rate of 150° C./h. After that, the resultant was sieved with a 45 μm sieve. Thus, a composite was obtained.

The composite was evaluated for the discharge capacity and the cycle characteristics of a battery using the composite. The results are shown in Table 1.

TABLE 1

|  | Discharge capacity [mAh/g] | Cycle characteristics (after 100 cycles) |
|---|---|---|
| Example 1 | 470 | 74.2% |
| Example 2 | 473 | 67.8% |
| Comparative Example 1 | 466 | 61.8% |
| Comparative Example 2 | 430 | 44.6% |
| Comparative Example 3 | 380 | 38.4% |
| Comparative Example 4 | 420 | 44.0% |
| Comparative Example 5 | 410 | 43.3% |

As is apparent from Table 1, the negative electrode materials of Example 1 and Example 2 each exhibit a high discharge capacity and excellent cycle characteristics as compared to the negative electrode materials of Comparative Examples. In addition, it was revealed that the physical properties were deteriorated by performing treatments of tar removal treatment and pulverization treatment as in Comparative Example 4.

According to the method of the present invention, a negative electrode material exhibiting a large discharge amount per mass can be obtained. In addition, through use of the negative electrode material of the present invention, a lithium ion battery having a high capacity and excellent charge-discharge cycle characteristics can be produced.

The invention claimed is:

1. A production method for a composite of fine particles (A) and carbon particles (B), comprising the steps of:
   mixing fine particles (A) formed of a substance comprising at least one kind of Si, Sn, Al, Ge and In; and molten pitch at a temperature of 275° C. or higher, to obtain a mixture 1;
   solidifying the mixture 1 to obtain a solidified mixture 1;
   pulverizing the solidified mixture 1 to obtain a pulverized product 2a;
   dry-mixing the pulverized product 2a and carbon particles (B) to obtain a mixture 3a; and
   firing the mixture 3a at a firing temperature of 800° C. or more and 1,200° C. or less, followed by pulverization.

2. A production method for a composite of fine particles (A) and carbon particles (B), comprising the steps of:
   mixing fine particles (A) formed of a substance comprising at least one kind of Si, Sn, Al, Ge and In; and molten pitch at a temperature of 275° C. or higher, to obtain a mixture 1;
   solidifying the mixture 1 to obtain a solidified mixture 1;
   adding carbon particles (B) to the solidified mixture 1, followed by dry mixing and pulverizing, to obtain a pulverized product 2b; and
   firing the pulverized product 2b at a firing temperature of 800° C. or more and 1,200° C. or less, followed by pulverization.

3. The production method for a composite according to claim 1, in which a first heat treatment for removing a tar component is not performed before the firing step.

4. The production method according to claim 1, in which the fine particles (A) are silicon particles each having a SiOx layer (0<x≤2) on a surface of the particle, have an oxygen content ratio of 1 mass % or more and 18 mass % or less, and contain, as a main component, particles each having a primary particle diameter of 200 nm or less.

5. The production method according to claim 1, in which the step of obtaining the pulverized product 2a comprises a step of performing the pulverizing with at least one of a ball mill, a jet mill, a rod mill, a pin mill, a rotary cutter mill, a hammer mill, an atomizer, or a mortar.

6. The production method according to claim 1, in which the carbon particles (B) are graphite particles.

7. The production method according to claim 1, in which the pitch has a softening point of 80° C. or more and 300° C. or less.

8. The production method according to claim 1, in which the carbon particles (B) have a 50% particle diameter (D50) in a volume-based cumulative particle size distribution measured with a laser diffraction particle size distribution measuring apparatus of 2 μm or more and 50 μm or less.

9. The production method according to claim 1, in which a total mass of a component derived from the pitch after the firing and the carbon particles (B) is twice or more and ten times or less as large as a mass of the fine particles (A).

10. The production method according to claim 1, in which a mass ratio of a component derived from the pitch after the firing with respect to the fine particles (A) is 0.1 or more and 10 or less.

11. The production method for a composite according to claim 2, in which a first heat treatment for removing a tar component is not performed before the firing step.

12. The production method according to claim 2, in which the fine particles (A) are silicon particles each having a SiOx layer (0<x≤2) on a surface of the particle, have an oxygen content ratio of 1 mass % or more and 18 mass % or less, and contain, as a main component, particles each having a primary particle diameter of 200 nm or less.

13. The production method according to claim 2, in which the step of obtaining the pulverized product 2b comprises a step of performing the pulverizing with at least one of a ball mill, a jet mill, a rod mill, a pin mill, a rotary cutter mill, a hammer mill, an atomizer, or a mortar.

14. The production method according to claim 2, in which the carbon particles (B) are graphite particles.

15. The production method according to claim 2, in which the pitch has a softening point of 80° C. or more and 300° C. or less.

16. The production method according to claim 2, in which the carbon particles (B) have a 50% particle diameter (D50) in a volume-based cumulative particle size distribution measured with a laser diffraction particle size distribution measuring apparatus of 2 μm or more and 50 μm or less.

17. The production method according to claim 2, in which a total mass of a component derived from the pitch after the firing and the carbon particles (B) is twice or more and ten times or less as large as a mass of the fine particles (A).

18. The production method according to claim 2, in which a mass ratio of a component derived from the pitch after the firing with respect to the fine particles (A) is 0.1 or more and 10 or less.

* * * * *